United States Patent
O'Gorman et al.

(10) Patent No.: US 11,386,381 B2
(45) Date of Patent: Jul. 12, 2022

(54) MEETING MANAGEMENT

(71) Applicant: International Business Machines Corporation, Armonk, NY (US)

(72) Inventors: Jonathan T. O'Gorman, Cork (IE); Anamitra Bhattacharyya, Chelmsford, MA (US); Boris Dozortsev, Newton, MA (US); Kavita Patil, Westford, MA (US); Krishnamohan Dantam, Chelmsford, MA (US); Yajin Zheng, Littleton, MA (US); Jonathan Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 516 days.

(21) Appl. No.: 16/001,230

(22) Filed: Jun. 6, 2018

(65) Prior Publication Data
US 2019/0378076 A1    Dec. 12, 2019

(51) Int. Cl.
*G06Q 10/06* (2012.01)
*H04M 3/56* (2006.01)

(52) U.S. Cl.
CPC ........ *G06Q 10/06398* (2013.01); *H04M 3/56* (2013.01)

(58) Field of Classification Search
None
See application file for complete search history.

(56) References Cited

U.S. PATENT DOCUMENTS

| | | | |
|---|---|---|---|
| 7,466,334 B1 | 12/2008 | Baba | |
| 7,831,427 B2 | 11/2010 | Potter | |
| 8,019,069 B1 | 9/2011 | Cyriac | |
| 8,849,907 B1 | 9/2014 | Hession | |
| 2009/0225971 A1 | 9/2009 | Miller | |
| 2011/0038472 A1 | 2/2011 | Gartner | |
| 2011/0060591 A1 | 3/2011 | Chavez | |
| 2012/0179981 A1* | 7/2012 | Whalin | H04W 4/021 715/753 |
| 2012/0269185 A1 | 10/2012 | Castleman | |
| 2013/0287187 A1 | 10/2013 | Gandhe | |

(Continued)

FOREIGN PATENT DOCUMENTS

CN    108921521 A   * 11/2018

OTHER PUBLICATIONS

Yang Shi et al. MeetingVis: Visual Narratives to Assist in Recalling Meeting Context and Content. Jun. 1, 2018. vol. 24, Issue: 6, pp. 1918-1929. (Year: 2018).*

(Continued)

*Primary Examiner* — Patricia H Munson
*Assistant Examiner* — Nancy N Prasad
(74) *Attorney, Agent, or Firm* — Fabian VanCott; Steven L. Nichols (57) ABSTRACT

A computer implanted method of updating a user joining a group after a user-relevant topic has been discussed, the method includes, with a processor operatively-coupled to a memory: identifying the user joining group after a first topic has been discussed in the current session of the group; and determining interest of the user in the first topic, wherein if the first topic is determined to be of interest to the user, providing an automated summary of the first topic to the user.

15 Claims, 6 Drawing Sheets

(56) References Cited

U.S. PATENT DOCUMENTS

2015/0149231 A1* 5/2015 Nicolas .................. H04W 4/80
                                                                705/7.19
2017/0018272 A1   1/2017 Lee
2017/0059337 A1* 3/2017 Barker ................. G01C 21/343
2018/0007100 A1* 1/2018 Krasadakis ........ G06Q 10/1095

OTHER PUBLICATIONS

Anonymous; "Tools and Analytics to Improve Conference Call and Web Meeting Efficiency"; Feb. 24, 2016; 3 pages; http://ip.com/IPCOM/000245272.

IBM; "Conference Call & Meeting Efficiencies with Voice Analysis"; Jan. 5, 2008; 10 pages; http://ip.com/IPCOM/000166230.

Anonymous; "Method and System is Disclosed for Alerting/Notifying Users About One or More Events Which May be of Interest to the One or More Users"; Jul. 20, 2010; 4 pages; http://ip.com/IPCOM/000197723.

IBM; "A method ot register interesting topics, check real-time meeting status and be notified before the interesting topics"; Dec. 14, 2007; 4 pages; http://ip.com/IPCOM/000162413.

* cited by examiner

MEETING MANAGEMENT

BACKGROUND

This specification relates to the area of meeting management, including conference calls. Phone conferences, teleconferences, and similar methods of allowing groups of people at different locations to communicate are a frequently used tool in business, government, and academic settings. Such virtual meetings avoid the time and expense of travel to a common location in order to meet.

SUMMARIES

This specification describes a computer implanted method of updating a user joining a group after a user-relevant topic has been discussed, the method including, with a processor operatively-coupled to a memory: identifying the user joining group after a first topic has been discussed in the current session of the group; and determining interest of the user in the first topic, where if the first topic is determined to be of interest to the user, providing an automated summary of the first topic to the user.

This specification also describes a method of increasing engagement of a user on topics of relevant to the user, the method including, with a computer having an associated memory: identifying a list of topics to be addressed in a meeting; identifying topics from the list of topics relevant to a first user; determining a desired level of engagement by the first user for each topic of the list of topics; monitoring engagement of the first user; and when engagement by the first user is below a desired level of engagement for a new topic, prompt the user to increase engagement.

This specification also describes a system for managing topics in a meeting, the system comprising: a processor with an associated memory, the associate memory containing instructions which, when executed, cause the processor to perform the following operations: identifying an agenda for the meeting, the agenda comprising a list of topics for the meeting; identifying participants in the meeting; determining an area of expertise for each participant in the meeting; determining areas of expertise for each topic; indicating which topics have at least one participant present with expertise in each area of expertise for the topic; receiving user input to adjust the order of topics; monitoring engagement of participants in the meeting; in response to moving to a new topic, prompting a participant with expertise relevant to the new topic when the participant has a level of engagement below a threshold; detecting a new participant joining the meeting after a first topic has been discussed; and providing an automated summary of the discussion of the first topic in the meeting to the new participant if the new participant has an area of expertise relevant to the first topic.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

When a participant joins the meeting after the meeting has started, the meeting often halts as participants update the new participant on the material already covered. This consumes the time of other people in the meeting without advancing discussion of the topics under consideration. Further, this phenomenon can result in people being present at the start of a meeting rather than joining just to discuss their relevant topics.

Technological devices have impacted meetings in multiple ways. Conference calls, with or without video, have displaced some face to face meetings due to the reduced travel time and cost. The ability to conference multiple groups have provided ways to coordinate activity over multiple sites.

However, technological devices have, in some cases, reduced participant attention and participation during meetings. Participants multitask during meetings, for example, checking email, texting, and otherwise directing their attention toward areas besides the meeting. Further, it can be hard to know if someone is actually paying attention to a call, just has the call playing in the background, and/or has left the room entirely. When a person's input is desired, it is not unknown participants to have to repeat material that was recently discussed because the person was distracted. This can frustrate participants and reduce the effectiveness of meetings.

Similarly, all portions of a meeting may not be equally relevant to a user. If none of the remaining items to be discussed in a meeting are relevant to the user, notifying that user and allowing them to leave may allow them to perform other activities.

While the described systems and methods may be used with multiple location meetings, such as conference calls, they may also be used with meetings in a single location. The benefits to updating arrivals and prompting attendees may be useful in a variety types of meetings.

In an example, the system includes a microphone and a speaker located in a room where meeting attendees are present. The microphone captures audio from the room. The speaker provides audio from other users located at other locations. The audio provided by the speaker may be similarly captured. The system may apply voice speech recognition to the audio tracks to parse the captured audio. After the captured audio is converted to text, the text may be searched to identify keywords and topics.

The system may use the captured audio to identify the speakers. Many speakers will audibly identify themselves when entering a conference call, e.g., Hi, this is Jane in Seattle. The system may use other methods to identify speakers and/or meeting participants. The system may identify participants by how the participant accesses the meeting. For example, if each user is provided a unique password to enter the conference call, the system may use the provided password to identify at least one speaker on the audio stream associated with that password. In an example, a scheduling tool has a list of invited participants. The list of invited participants may be used to aid in identifying participants. Whether a participant accepted or rejected the meeting invite may also be considered.

Once a participant has been identified, the system attempts to determine areas of interest, knowledge, and/or expertise for the participant. This may include querying a database of participants. The system may access meeting minutes from previous meetings with the user and perform keyword/correlation analysis to extract areas of knowledge. A system may have access to personal records, work history information, current title, and/or areas of responsibility, The system may also identify a list of topics that will be covered in the meeting. This may be provided by an agenda accessible to the system. This may be provided by a list of open action items. This may be obtained by parsing the audio streams. In an example, the system displays multiple topics in an expected order of discussion. The system then accepts input from a user to adjust the order, for example, to address issues that have increased in priority and/or issues where the relevant persons are in attendance.

The system may then determine user interest in each of the topics of the list of topics to be covered. The system may correlate identified user areas of interest, expertise, and/or knowledge with the topics. The system may review previous meeting information and discussions to assess user interest in related topics. For example, if a user has a title of website designer, and/or was actively involved in previous discussions of the website design, the system may determine a topic related to issues of the website layout will be of interest to the user and/or related to the user's expertise. Similarly, a topic of pricing models may not relate to that user's areas of interest, knowledge, and/or expertise.

The system may prepare a timeline for the meeting and illustrate the expected user interest and/or involvement at various points in the meeting. The illustrated timeline may include estimates of how long until a future topic is discussed. The illustrated timeline may be adjusted in response to user reorganization of the order of topics to be covered.

As used in the present specification and in the appended claims, the term "a number of" or similar language is meant to be understood broadly as any positive number including 1 to infinity.

Figure 1:
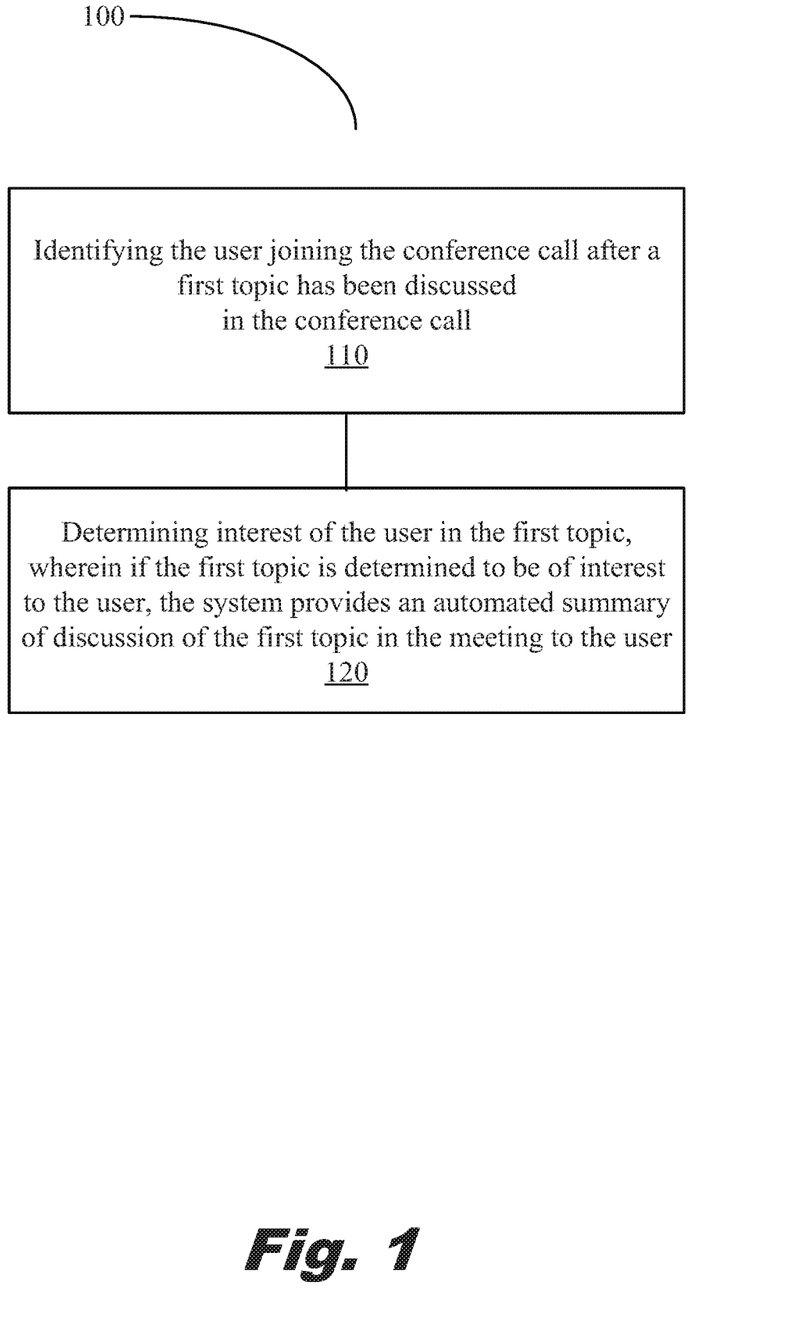
FIG. 1 depicts a flowchart of a computer implanted method of updating a user joining a conference call after a user-relevant topic has been discussed according to an example of principles described herein.

Turning now to the figures, FIG. 1 depicts a flowchart of a computer implanted method (100) of updating a user joining a conference call after a user-relevant topic has been discussed, the method comprising, with a processor operatively-coupled to a memory: identifying the user joining the conference call after a first topic has been discussed in the conference call (110); and determining interest of the user in the first topic, wherein if the first topic is determined to be of interest to the user, providing an automated summary of the first topic to the user (120).

The computer implemented method (100) is a method (100) of updating a user joining a group after a user-relevant topic has been discussed. The group may be an in person meeting with all participants at a single location. The group may be a conference phone call with multiple people at multiple locations. The group may include sub-groups on a speakerphone(s). The group may include individuals participating on a networked computer. The group may use an audio channel, a video channel, a text channel, an instant messaging channel, and/or other channels to communicate within the group.

Participants in a meeting may discuss topics in an order. For example, there may be an agenda associated with the meeting. In an example, there is a list of action items from a previous meeting which is used to populate the agenda. Completed items may be removed from the list of action items. Completed items may be indicated visually, for example, using a different color text, highlighting the current topic, strikeout, placement in a different list, etc. New items may be added to the agenda and/or the list of action items based on user input and/or harvested from participant communication during a meeting. In an example, the agenda for a reoccurring meeting may be automatically prepared by the system based off an action items list. Meeting participants may have the ability to suggest and/or add and/or remove items from the agenda. In an example, a moderator and/or similar individual approves changes to the agenda. In an example, each participant may make changes to the agenda.

It is not an infrequent occurrence for a person to join the group after a first topic has already been discussed. This can be disruptive to the current topic as the new participant is unfamiliar with the recent discussion. Sometimes, the meeting will bog down as a person in the group updates the new participant about the items covered, decisions reached, etc. This takes time in the meeting that could be used for more productive activities. Some participants may move to other tasks while the new participant is being updated, cause a loss of focus and/or attention to the most recent topic.

The method (100) includes identifying the user joining the conference call after a first topic has been discussed in the conference call (110). The user may be identified using a variety of different methods. In an example, the user is identified by an indictor associated with how they joined the group. The indicator may be a characteristic associated with the user's communication. For example, the indicator may be a phone number, a MAC address of the computer, a password, a computer configuration, a cookie, etc.

The user may be identified by a new connection being formed to a call. This has the benefit of allowing identification of the user as part of providing access to the call, for example, by a password and/or similar. The user may be identified by audio content from a call. For example, the new user may state that they are joining, e.g., "Hi, this is Paul, sorry to be late." The new user may be identified by others in a common room and this information conveyed to others in the call, e.g., "Kate just joined us."

The system also identifies a first topic. The system may parse the audio of the meeting. The system may extract points from the discussion. The system may organize those points under topics. In an example, the topics are prepopulated based on an agenda and/or a similar document(s). The topics may include anything which occupies the discussion for a predetermined length of time. The list of topics may be filtered to exclude non-work related topics.

The method (100) includes determining interest of the user in the first topic, wherein if the first topic is determined to be of interest to the user, providing an automated summary of the first topic to the user (120).

Determining whether a first topic is of interest to a user may begin with identifying interests of a user. The system may access a database of user interests. The system may review user comments from previous meetings. The system may evaluate a user's resume to assess a user's areas of interest. The system may assess a user's position in an organization, for example, product engineering or marketing, to determine topics of interest. The system may parse a list of action items and/or group goals to determine user interests and/or relevance.

In an example, topics are checked to see if they appear on a list of user preferences. Topics may be characterized by similar but not identical keywords. For example, a user's resume may say "processor design" and the topic may be "new core layout," resulting in mismatch. This may make straight matching less effective at determining matches. In an example, the system develops a score to assess the user's interest level, for example ranging from 0 to 100%. The score may then be compared against a cutoff. The use of a score based approach is that it better deals with fuzzy terminology and mismatch of related topics by providing partial credit for such.

The system may automatically provide a summary for all topics with a score above a cutoff. The system may prompt the user if they want summaries for topics below the cutoff. In an example, the system may automatically provide summaries for scores above 70% (on 0-100% scale), prompt for scores from 40% to 70%, and not prompt for scores below 40%. The system may automatically summarize for the user the highest rated topic, and prompt for the second highest ranked topic. If the user requests a summary on the second highest ranked topic, the system may provide a summary on the second ranked topic and prompt on a third ranked topic, and so on until the user declines a summary. The system may automatically update on the top one, two, three, and/or other number and/or percentage of previous covered topics. The system may automatically update on all previously covered topics. The amount of detail in the update may depend on a score for each topic, with higher interest levels correlating with more details. In an example, an option is provided for more details and/or full transcripts on any and/or all of the previously covered topics. The summary may be a set of collapsed points which may be expanded to expose more detail. In an example, the summary may include an amount of time spent on a topic to aid the user in determining the history of the meeting before the user joined.

If the system determines the first topic is of interest to the user, the system provides an automated summary to the user. The summary may be provided in an audio channel prior to joining the user to the meeting. The summary may be provided in another channel outside an audio channel being used for the meeting. For example, the system may email the summary to a user on their phone. The system may text the summary to a phone number associated with the user. The system may communicate the summary using a predetermined channel selected by the user as part of a profile. The system may prompt the user to select a channel to receive the summary.

The system may provide the summary in a display. In an example, the user is participating via a computer with a speaker, a microphone, and a video display. The speaker and/or microphone may be connected to the meeting while the display is used to provide the automated update to the user. Such a computer may be a desktop, laptop, tablet, smartphone, and/or other general purpose computer system. The automated update may respond to a user action to display. For example, links to multiple summaries may be shown to the user allowing the user to select which summaries to read.

The system may use other channels to provide the summary to the user. Using a channel accessible to the user while the user participates in the meeting allows the user to catch up on previous discussions and determinations without disrupting the meeting and/or forcing the group to recap the relevant information for the user. Using a channel other than the audio channel of the meeting reduces disruption of the meeting and/or time between the new user joining and being able to participate in the meeting.

In an example, the automated summary is provided in a channel other than the channel providing the conference call. The automated summary may be provided by email. The automated summary may be provided in a chat window. The automated summary may be provided in an audio channel. The automated summary may be played at higher than recorded speaking speed to reduce the time to provide the summary to the user.

The system may determine interest of the user in the first topic by comparing the first topic against the user's areas of expertise. The users' areas of expertise may be determined by querying a database containing information on the user and receiving information on the user from the database.

Figure 2:
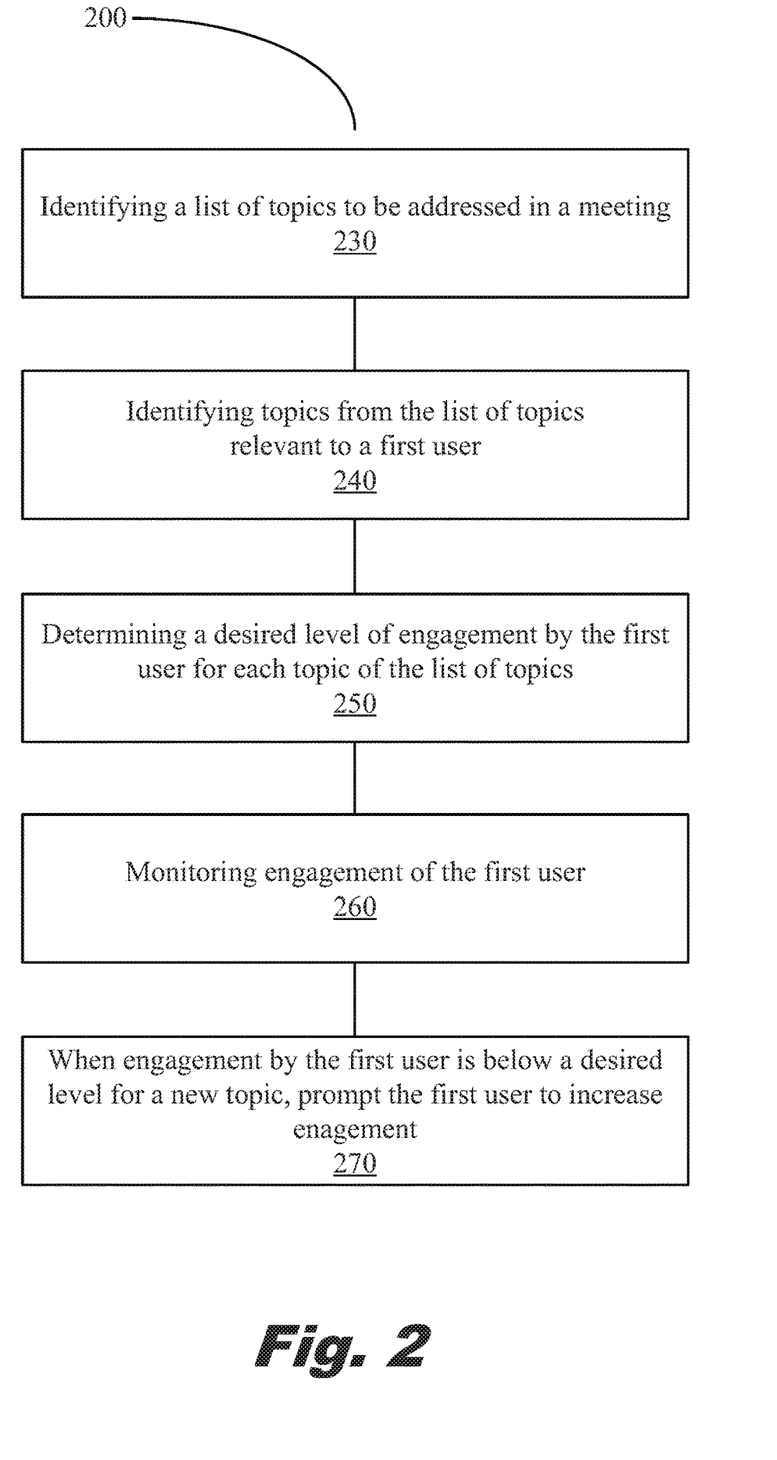
FIG. 2 depicts a flowchart for a computer implemented method of increasing engagement of a user on a topic relevant to the user according to an example of principles described herein.

FIG. 2 depicts a flowchart for a computer implemented method (200) of increasing engagement of a user on a topic relevant to the user, the method comprising, with a computer having an associated memory: identifying a list of topics to be addressed in a meeting (210); identifying topics from the list of topics relevant to a first user (220); determining a desired level of engagement by the first user for each topic of the list of topics (230); monitoring engagement of the first user (240); and when engagement by the first user is below a desired level of engagement for a new topic, prompting the user to increase engagement (250).

The method (200) is a method of increasing engagement of a user on a topic relevant to the user. Meetings may include multiple topics that are relevant to two and/or more parties but not each topic may be relevant to all participants. When the meeting is discussing a topic not particularly relevant to a user, the user may pay less attention to the discussion of the meeting. The user may be less engaged in the meeting. If participating by phone and/or videoconference, the user may multitask. Even participants in live meetings may be checking their emails, text messages, etc. while other topics are being discussed. Further, not all of this lack of attention is necessarily bad. Persons without responsibility and/or knowledge of a topic may not increase the quality of discussion and/or decision making. Involving them may involve reviewing development history and/or basic principles in the field. However, when the subject matter changes to a topic that is relevant to the non-participating user, the user's lack of attention may disrupt the meeting. Accordingly, it may be useful for the system to prompt a user as and/or prior to a relevant topic being discussed to engage the user.

The method (200) includes identifying a list of topics to be addressed in a meeting (210). The system may receive the list from a user. The system may compile the list. The system may parse documents to compile the list. For example, the system may review an agenda, a list of action items, a meeting invite, and/or other document(s) to form the list of topics. The list of topics may be reviewed by a member of the meeting. The system may allow a user to add, remove, and/or reorder topics on the list of topics.

The method (200) includes identifying topics from the list of topics relevant to a first user (220). The system may identify a list of areas of interest and/or expertise for the first user. For example, the system may access a database. The system may extract areas of expertise from a resume and/or similar files. The system may access an internal and/or external social network to determine areas of expertise and/or interest. The system may review a user generated profile. The system may make determinations based on the identified topics and a job title and/or work group of the first user. For example, a first user in the marketing group may be presumed interested in marketing related activities. A first user, with a job description of process development engineer, may be presumed to have process development as an area of expertise. In an example, the system presumes that each topic identified for the meeting has at least one person invited to the meeting who has an area of interest and/or expertise related to the topic.

The system may then identify the topics relevant to the first user by comparing the first user's areas of interest and/or expertise and the list of topics. As discussed above, matching may be binary. Matching may be fuzzy with a relevance score provided for each topic for the first user. In an example, the system receives information that indicates a responsibility for a given topic for a first user. For example, a presentation associated with a meeting may list a first user as a presenter and/or contributor to slides on a topic. Similarly, lists of action items may include group and/or individual assignments for the associated topics.

The method (200) includes determining a desired level of engagement by the first user for each topic of the list of topics (230); The system may include a number of discrete engagement categories, for example: not-relevant (1), optional (2), invited (3), knowledgeable (4), subject matter expert (5), and presenter/responsible party (6). The system may map the user's interest to the engagement categories. For example, the system may assign a category of invited to all topics below a threshold and a category of knowledgeable (4) to all topics equal to or greater than the threshold. The system may map a continuous topic relevance score to the categories. The system may adjust the categories based on other participants in the meeting. For example, if multiple people with overlapping expertise are invited, the relevance may be lowered for one of these people. If a person is the most relevant person in the meeting to a topic, then the engagement category for that person may be increased, for example, to knowledgeable (4) and/or presenter/responsible party (6).

The method (200) includes monitoring engagement of the first user (240). The system may monitor speaking by the first user in an audio channel of the meeting. The system may monitor activity on a user's device. The system may monitor a user's contributions in a text box and/or a chat function. The system may monitor whether the user's microphone is muted. The system may combine multiple factors and/or measurements to determine a user's engagement level.

The method (200) includes when engagement by the first user is below a desired level of engagement for a new topic, prompting the user to increase engagement (250). By prompting the first user, the first user may increase engagement and be ready for the topic of increased relevance. This may avoid having to repeat material if the first user was not following the topic closely and/or was unaware of the change to the new, relevant topic.

In an example, the prompt is provided over an audio channel providing the audio of the meeting to the first user. The prompt may be provided only to the first user, for example, on the first user's telephone without providing the prompt to other users on the conference call. This avoids the prompt distracting and/or annoying other users who were engaged in the call. The prompt may be provided in a display. For example, the display may flash and/or otherwise display a signal to attract the user's attention. The prompt may be another sort of prompt, for example, vibrating a phone and/or other device. The prompt may be provided with a device likely to be with the first user even if the first user is no longer at a speakerphone and/or computer terminal being used for the meeting. In an example, the prompt is provided to the user's mobile phone. The prompt may be provided using multiple modes and/or types of signals. Sound of the prompt may be excluded from an audio stream being used for the meeting. For example, the prompt may be provided to a first user's phone but scrubbed from an audio stream of a speakerphone in a room with the first user. This may reduce the disruption the prompt causes on other participants in the meeting.

The desired level of engagement may vary based on the relevance of the topic to a user's areas of expertise and/or interest. For example, the desired level of engagement may be greater for topics relevant to an area of expertise of the user than for areas unrelated to the area of expertise of the user. Part of the purpose of having experts in a meeting is to have them available to evaluate areas relevant to their expertise. In contrast, the value of a subject matter expert outside their area of expertise may be reduced.

The method (200) may further include creating a timeline of desired engagement of the first user based on areas of expertise of the first user and the list of topics. The method (200) may include displaying the timeline to the first user. Such a timeline could show a user when they were expected to be engaged vs. when their participation not expected. The timeline may include a marker for the current time, for example, as a bar crossing the timeline and/or as a progress bar. The timeline may include estimated times of the changes between topics. Further discussion of the timeline is available under FIG. 4, below.

Figure 3:
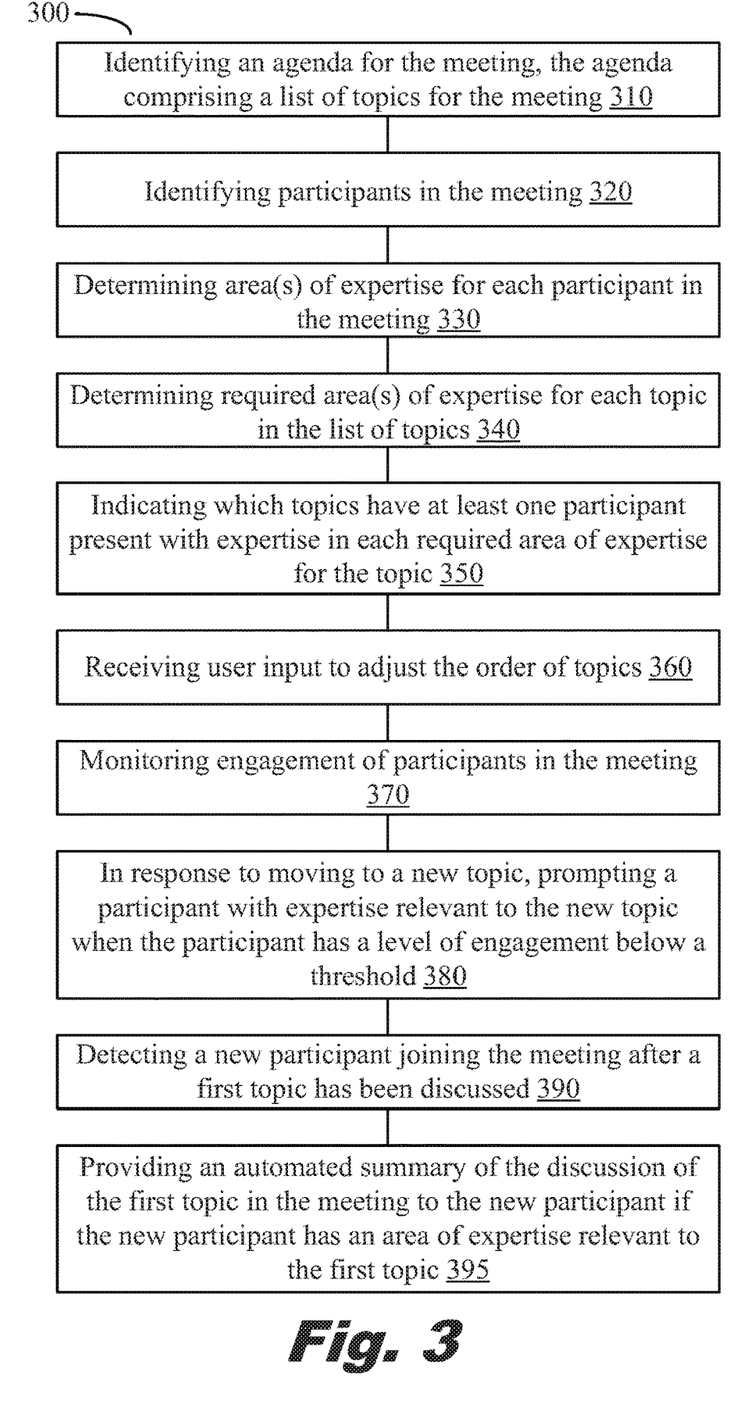
FIG. 3 depicts a system for managing topics in a meeting according to an example of principles described herein.

FIG. 3 depicts a system (300) for managing topics in a meeting, the system including a processor (310) with an associated memory (320), the associate memory (320) containing instructions which, when executed, cause the processor to perform the following activities: identify an agenda for the meeting, the agenda comprising a list of topics for the meeting (322); identify participants in the meeting (324); determine areas of expertise for participants in the meeting (326); determine areas of expertise for each topic (328); indicate which topics have a participant present with expertise in each area of expertise for the topic (330); receive user input to adjust the order of topics (332); monitor engagement of participants in the meeting (334); in response to moving to a new topic, prompt a participant with expertise relevant to the new topic when the participant has a level of engagement below a threshold (336); detect a new participant joining the meeting after a first topic has been discussed (338); and provide an automated summary of the discussion of the first topic in the meeting to the new participant if the new participant has an area of expertise relevant to the first topic (340).

In an example, the automated summary is provided in written format, for example, displayed in a chat window, an email, a text, etc.

Monitoring participant engagement may include monitoring participant speech in the meeting. The system may determine the amount of time a participant spoke, the amount of time since the participant last spoke, whether the participant asked questions and/or provided answers to questions, etc. The system may monitor activity of the user on a device being used to communicate with the meeting.

The system (300) is a system (300) for enhancing the effectiveness of meetings. The processor (310) may be a single processor. The processor (310) may include multiple processors, for example, a multi-core processor. The processor (310) may include multiple processors in multiple devices.

The associated memory (320) is accessible by the processor (310) such that the instructions from the associated memory (320) are processed by the processor (310) to perform the described operations.

The system (300) identifies an agenda for the meeting, the agenda comprising a list of topics for the meeting (322). The agenda may be extracted from documents available to the system. The agenda may be dynamically created as meeting topics are discussed and reviewed during the meeting. The agenda may be provided by a participant.

The system (300) identifies participants in the meeting (324). The system (300) may determine participants based on how participants access the meeting. The system (300) may determine participants based on self-identification. The system (300) may perform voice and/or facial recognition to identify participants. The system (300) may consult a meeting invitation to identify possible participants.

The system (300) determines areas of expertise for participants in the meeting (326). The system (300) may access a database of areas of expertise for individuals. The system (300) may consult a human resources (HR) database. The system (300) may consult a knowledge database of in house expertise. The system (300) may extract areas of expertise for a participant from documents, such as a resume, a social media profile, a professional profile, a job title, a job description, etc.

The system (300) determines areas of expertise for each topic (328). The system (300) may determine areas of expertise based on responsibility for the topic. The system (300) may determine areas of expertise based on action items associated with the topic. The system (300) may determine areas of expertise for a topic based on areas of expertise assigned to similar topics previously. In an example, the system (300) queries a user to identify and/or verify areas of expertise for a topic. The system (300) may query an identified subject matter expert. The system (300) may query a moderator and/or similar facilitator. In an example, the system (300) checks identified subject matter experts for relevant skills that should be considered in a subsequent meeting. The system may develop a database and/or data structure of relationships between topics and associated skills. In an example, the system (300) queries such a database of topic-skill relationships to provide an initial determination of relevant skills.

The system (300) indicates which topics have a participant present with expertise in each area of expertise for the topic (330). In an example, the agenda is provided with a first icon indicating the expertise is present in the meeting and a second icon indicting the expertise is not present in the meeting. This allows a participant to decide to delay a topic until the person with the desired expertise to arrive. The participants may opt to go ahead without a subject matter expert. For example, the expert may have provided instructions on the matter to another participant who is not recognized as subject matter expert by the system but can provide the information needed for the meeting.

The system (300) receives user input to adjust the order of topics (332). The system (300) may allow a user to adjust the order of topics in the agenda. The system (300) may allow a facilitator to adjust the order of topics in the agenda while not allowing other participants to make adjustments. In an example, the system (300) allows participants to suggest changes which are approved and/or implemented by the facilitator. The ability to adjust the order of topics allows the system (300) to compensate for unexpected delays and/or absence from the meeting. However, changes to the order of topics may also impact the expected levels of engagement at various times for participants. For example, if a topic related to a participant is moved to the end of the meeting, that participant may not be able to leave the meeting until the end of the meeting. This may result in less effective use of the meeting time when other topics which are not relevant to the participant are discussed.

The system (300) monitors engagement of participants in the meeting (334). The system (300) receives information from a sensor associated with a participant. For example, an audio sensor, a video sensor, a motion sensor, a pressure sensor, e.g., a keyboard, etc. The sensor may indicate engagement of a participant. The sensor may indicate non-engagement of the participant. The determination of engagement vs. non-engagement from the sensor may be dependent on the signal. For example, the user typing in a chat associated with a meeting may be evidence of engagement.

The system (300), in response to moving to a new topic, prompts a participant with expertise relevant to the new topic when the participant has a level of engagement below a threshold (336). When a new topic is introduced, the system may (300) check the engagement levels of the participants. The system (300) identifies which participants are currently engaged at below the desired engagement level for the new topic. The system (300) then prompts those under-engaged participants to help them realize that their expertise/participation is now needed in the meeting. This may avoid having to repeat material when the participant's contribution is needed. This also allows the participant to multitask while recognizing that when they are needed, they will get a prompt.

The system (300) detects a new participant joining the meeting after a first topic has been discussed (338). The methodology used may be similar to identifying participants in the meeting. The system (300) may detect new connections to the meeting. The system (300) may identify a new participant by their identification in an audio stream, either self-identified and/or by another person identifying them. The system (300) may use a list of meeting invitees to aid in identifying a new participant. The system may use an organization chart and/or similar organizational information to identify a participant. The system may use social media to identify a participant.

The system (300) may identify a list of topics that have been discussed in the meeting so far. In an example, the system (300) automatically populates meeting notes based on a discussion in the meeting. The meeting notes may summarize decisions, issues, etc. identified in the meeting. The system may condense the meeting notes to points and/or similar brief statements. The system may provide a transcript linked to each point. The system may provide a transcript for each topic. They system (300) may provide a transcript with relevant material from the transcript visually indicated. For example, relevant material may be italicized. Decisions and/or issues may be presented in bold. The relevant material may be presented in a first text and material on other topics italicized, underlined, presented in a second font, etc. to distinguish the topics. The system may allow participants to edit the transcript and/or extracted materials, e.g., indexed points, topics, summaries, decisions, issues, etc. In an example, the system (300) allows this editing during the meeting. The system may allow all participants to edit the material. The system may allow a subset of participants to edit the material. The system may allow participants to propose edits which are approved by another participant, such as a moderator, manager, and/or someone with subject matter expertise on the topic.

The system (300) provides an automated summary of the discussion of the first topic in the meeting to the new participant if the new participant has an area of expertise relevant to the first topic (340). The system may (300) provide a message indicating no subjects relevant to the new participant's areas of expertise have been discussed.

In an example, a determination is made that a specified event of a collaborative computing session has occurred. In response to the specified event, a real-time electronic notification is transmitted to an attendee of the session that the event has occurred, the notification illustratively transmitted via a communication channel other than the session.

The system (30) correlates topic terms to individuals, monitors active and inactive attendance to determine level of engagement generates a model to determine temporal areas of interest, and these temporal areas of interest are then used to notify users depending on their level of engagement.

Figure 4:
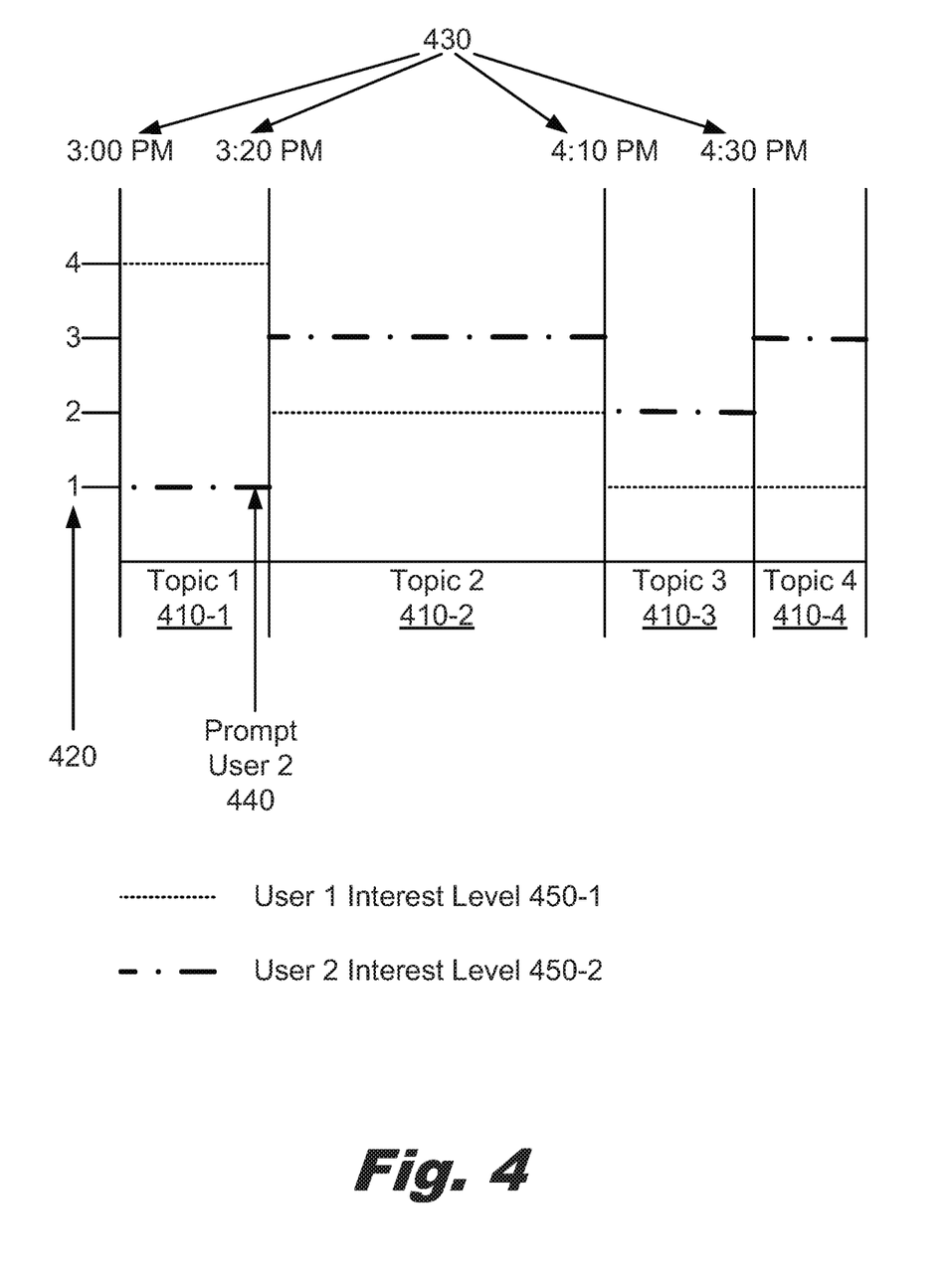
FIG. 4 depicts an example of a timeline generate by a system according to principles described herein.

The system (300) may employ a learning system and feedback system to determine whether specific notifications were useful. That information may be used to increase the relevance of the prompts and/or notifications and/or decrease the number of less useful prompts and/or notifications FIG. 4 depicts an example of a timeline (400) created by an example of a system consistent with this specification. The timeline (400) depicts a set of topics (410) along a time axis. The time axis in this example also indicates the times (430) when discussion is expected to transition between topics (410). The vertical axis indicates a scale for the calculated interest level (420) in the various topics for a user. In this example, the interest levels for different users are shown with different patterns (450) allowing the interest levels of multiple users to be displayed concurrently. A point just prior to the transition from Topic 1 (410-1) to Topic 2 (410-2) when user 2's interest is expected to increase indicates a prompt for user 2 (440).

The timeline (400) provides the topics (410) in an order. The timeline (400) may provide an estimated time per topic (430). The timeline (400) may allocate time equally between topics. The timeline (400) allocate time based on similar topics in previous meetings.

The topics (410) indicate the topics to be discussed in a meeting. The topics (410) may include other topics associated with participants in the meeting that are not being covered in the current meeting. For example, a meeting between a company and a client may cover topics (410) A and B but not topic (410) C which requires a person who is currently unavailable. The topics (410) may be displayed with different fonts, colors, formatting, and/or position, to indicate information about the topics (410). For example, the current topic (410) may be highlighted and/or otherwise indicted to allow a user to rapidly assess what is currently happening.

The scale (420) may be a continuous scale (420). A continuous scale (420) may be formatted and scaled to produce a numerical value, for example, from 0 to 100 and/or similar.

The scale (420) may be categorical. A categorical scale (420) may include categories such as: Not needed (1), Optional (2), Requested (3), Knowledgeable (4), Subject Matter Expert (5), and Presenter (6).

The times (430) may be calculated based on data from previous meetings on similar and/or identical topics. For example, with a recurring meeting, the amount of time for a given topic may be substantially the same week after week. In other examples, the amount of time allocated may be indicated by a user, for example, in an agenda. The amount of time for each topic may be defaulted to an equal allocation of time to topics, for example, if an hour meeting has three topics identified, each could be allocated 20 minutes. In another example, earlier topics may be given more time as earlier topics may have higher priority and/or importance. So a one hour meeting might be allocated time to three topics as follows: 30 minutes, 20 minutes, and 10 minutes.

In an example, the amount of time allocated to the activity is fixed. For example, a weekly status meeting may be fixed to 50 minutes. In another example, the times are estimated without a predetermined limit, for example, when reviewing a customer concern about 4 different product issues.

The system may include a prompt indicating time for a given topic (410) is complete. The system may include a five-minute, two-minute, one-minute, and/or similar warning(s) that time is about to expire for a topic (410). The warning may be provided to all participants. The warning may be provided to a subset of participants. In an example, a moderator and/or person charged with directing discussion of the current topic is provided the warning. The warning may be audible and/or visual. In an example, a countdown timer is provided in a display for a participant.

The prompt (440) may check a user's interest level prior to an expected increase in the user's interest level. The prompt (440) may signal a user who's relevance is about to increase. The prompt (440) may signal as part of a topic change. The prompt may signal before an expected topic change. The prompt may be provided when a user's current attention is below a predetermined threshold.

The user interest level may be assessed by using a correlation function between keywords associated with the topic and keywords in a user's background. The user's interest level may be adjusted based on other people in the meeting. For example, a junior member of a group may have their interest level increased if no senior level person from that group is present. The system may identify a lead person for each topic based on who is present in the meeting. A participant may have their interest level modified based on invitees who are not present in the meeting. Similarly, if an additional expert is present, the interest level of participants with overlapping skills may be modified.

The topics (450) may include an active topic (450). The system monitors communication on the active topic (450). The system monitors communication to determine when the meeting is advancing to the next topic (450). The system may automatically take notes and/or dynamically summarize the conversation on the current topic. This dynamic summary may be available to a user for review. The dynamic summary may be available to a user for editing/correction. The system may consult previous summaries, the system may check edits made to previous summaries, and/or the system may document user edits as ways to increase the quality of the automatically generated summary. The dynamic summary may be used as an automatically provided summary for a late arrival. The dynamic summary may be used as a basis for an automatically generated and provided summary.

For example, the system may identify multiple references to a person and/or object by different names and standardize the name in the summary based on a user edit. The system may insert commonly used acronyms and/or provide a full name for an acronym; this choice may depend on the user receiving the summary. For example, a summary may include many engineering acronyms while marketing terms are spelled out for an engineering user. In contrast, engineering acronyms could be replaced and marketing acronyms used for a summary for the head of marketing. Company internal project identifiers may be scrubbed prior to providing the summary to an external party. Accordingly, the automatically generated summaries may include personalization based on the person and/or group receiving the summary.

The system may monitor communication to identify additional material to define the topics and areas of expertise of the participants. For example, a spreadsheet may be presented and/or shared as part of the meeting. A presentation and/or reports may be referenced during the meeting but not presented. In an example, the system searches for the mentioned reference in shared drives. The system may request a participant to identify the reference. The system may automatically generate copies of such resources for storage in a project file. The system may parse other documents in an identified project file.

The timeline (400) may include a current time indicator. The timeline (400) may include a progress bar. The timeline (400) may provide a list of participants by order of user interest. This list may include the names of participants who are not attending. Such absent participants may be indicated. The list may indicate how participants are participating the meeting, in person, by phone, by videoconference, room 1, room 2, etc.

The timeline (400) may indicate which topics lack a needed individual and/or expertise. For example, the timeline may use an icon to indicate a needed area of expertise appears to be lacking from the current group of participants.

The timeline (400) may allow a user to reorder the topics (410). For example, if the next topic is an interface error and the subject matter expert is late, a moderator may choose to skip discussion of the interface error until the subject matter expert is present. The moderator may rearrange the order of topics (410) for other reasons. For example, a moderator may rearrange the order of topics to put topics with more participants first and topics of interest to a smaller group latter so that some participants may leave after the topics relevant to their areas have been covered. In an example, the system suggests such rearrangements for participant review and approval prior to automatic implementation.

Figure 5:
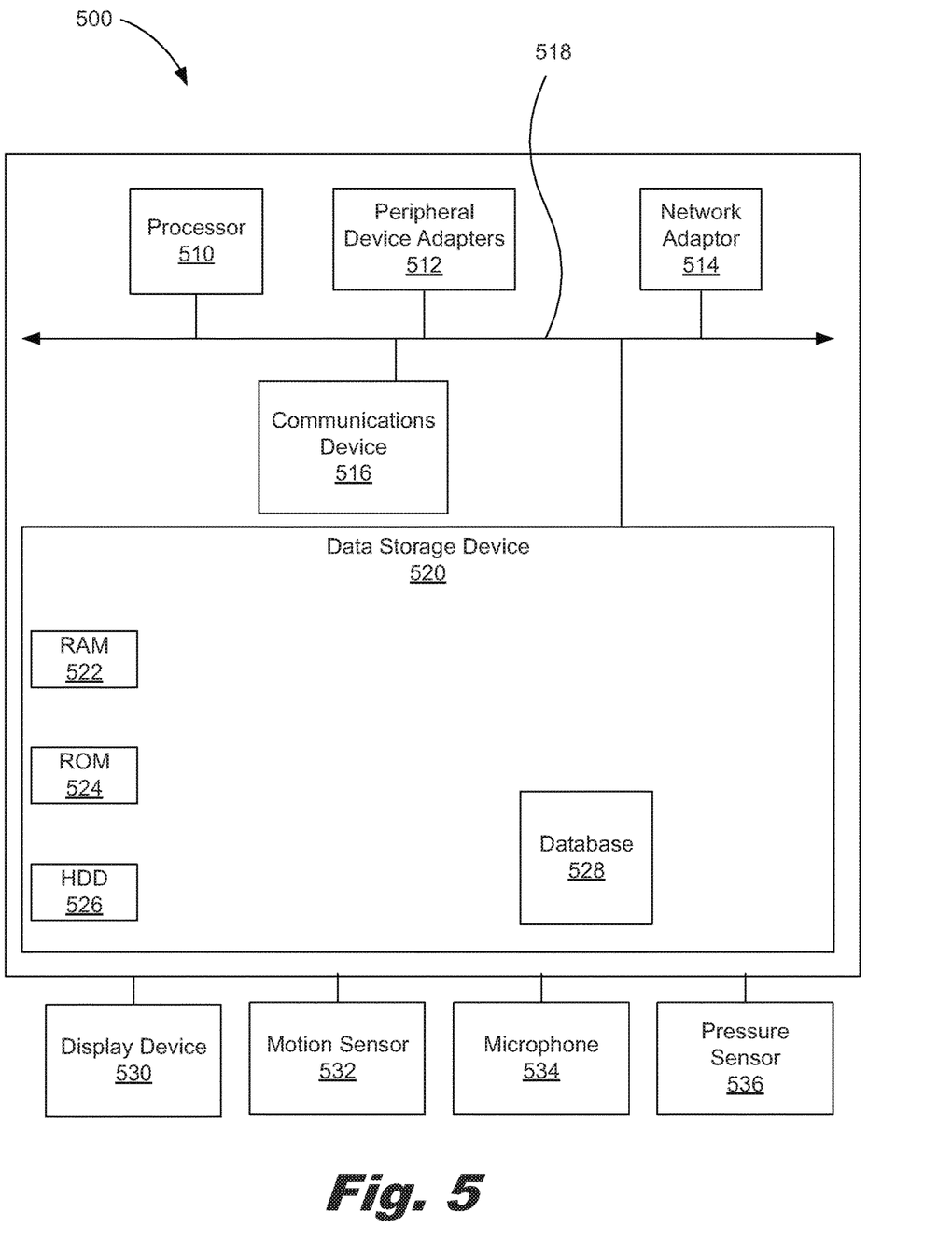
FIG. 5 depicts a computer system for managing meetings according to an example of principles described herein.

FIG. 5 is a diagram of a computing device (500) for meeting management, according to an example of the principles described herein. The computing device (500) may be implemented in an electronic device. Examples of electronic devices include servers, desktop computers, laptop computers, personal digital assistants (PDAs), mobile devices, smartphones, gaming systems, and tablets, among other electronic devices.

The computing device (500) may be utilized in any data processing scenario including, stand-alone hardware, mobile applications, through a computing network, or combinations thereof. Further, the computing device (500) may be used in a computing network. In one example, the methods provided by the computing device (500) are provided as a service over a network by, for example, a third party.

To achieve its desired functionality, the computing device (500) includes various hardware components. Among these hardware components may be a number of processors (510), a number of data storage devices (520), a number of peripheral device adapters (512), and a number of network adapters (514). These hardware components may be interconnected through the use of a number of busses and/or network connections. In one example, the processor (510), data storage device (520), peripheral device adapters (512), and a network adapter (514) may be communicatively coupled via a bus (518).

First, the computing device (500) includes a communication device (516) which refers to hardware used to pass information to and/or from a meeting participant.

The processor (510) may include the hardware architecture to retrieve executable code from the data storage device (520) and execute the executable code. The executable code may, when executed by the processor (510), cause the processor (510) to provide a summary of a previously covered topic to a user joining a meeting. The functionality of the computing device (500) is in accordance to the methods of the present specification described herein. In the course of executing code, the processor (510) may receive input from and provide output to a number of the remaining hardware units.

The data storage device (520) may store data such as executable program code that is executed by the processor (510) or other processing device. As will be discussed, the data storage device (520) may specifically store computer code representing a number of applications that the processor (510) executes to implement at least the functionality described herein.

The data storage device (520) may include various types of memory modules, including volatile and nonvolatile memory. For example, the data storage device (520) of the present example includes Random Access Memory (RAM) (522), Read Only Memory (ROM) (524), and Hard Disk Drive (HDD) memory (526). Other types of memory may also be utilized, and the present specification contemplates the use of many varying type(s) of memory in the data storage device (520) as may suit a particular application of the principles described herein. In certain examples, different types of memory in the data storage device (520) may be used for different data storage needs. For example, in certain examples the processor (510) may boot from Read Only Memory (ROM) (524), maintain nonvolatile storage in the Hard Disk Drive (HDD) memory (526), and execute program code stored in Random Access Memory (RAM) (522).

The data storage device (520) may include a computer readable medium, a computer readable storage medium, or a non-transitory computer readable medium, among others. For example, the data storage device (520) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The data storage device (520) may include a database (528). The database (528) may include areas of expertise and/or interest for individuals. The database (528) may include topic-keyword relationships. The database (528) may contain topic summaries for provision to late arrivals to a meeting.

Hardware adapters, including peripheral device adapters (512) in the computing device (500) enable the processor (510) to interface with various other hardware elements, external and internal to the computing device (500). For example, the peripheral device adapters (512) may provide an interface to input/output devices, such as, for example, display device (530), a microphone (534), a motion sensor (532) or a keyboard and/or mouse, e.g. a pressure sensor (536). The peripheral device adapters (512) may also provide access to other external devices such as an external storage device, a number of network devices such as, for example, servers, switches, and routers, client devices, other types of computing devices, and combinations thereof.

The display device (530) may be provided to allow a user of the computing device (500) to interact with and implement the functionality of the computing device (500). The peripheral device adapters (512) may also create an interface between the processor (510) and the display device (530), a printer, or other media output devices. The network adapter (514) may provide an interface to other computing devices within, for example, a network, thereby enabling the transmission of data between the computing device (500) and other devices located within the network.

The computing device (500) may, when executed by the processor (510), display the number of graphical user interfaces (GUIs) on the display device (530) associated with the executable program code representing the number of applications stored on the data storage device (520). The GUIs may display, for example, interactive screenshots that allow a user to interact with the computing device (500). In an example; the GUI displays a timeline such as one shown in FIG. 4. Examples of display devices (530) include a computer screen, a laptop screen, a mobile device screen, a personal digital assistant (PDA) screen, and a tablet screen, among other display devices (530).

The computing device (500) further includes a number of modules used in the implementation of the systems and methods described herein. The various modules within the computing device (500) include executable program code that may be executed separately. In this example, the various modules may be stored as separate computer program products. In another example, the various modules within the computing device (500) may be combined within a number of computer program products; each computer program product including a number of the modules.

The computing device (500) may include a motion sensor (532). This motion sensor may be used to provide information to support a determination of attention and/or engagement level from a user. The computing device (500) may include a microphone (534). The microphone (534) may be used to provide information to support a determination of attention and/or engagement level of a user. The computing device (500) may include a pressure sensor (536) such as a keyboard and/or mouse. The pressure sensor (536) may be used to provide information to support a determination of attention and/or engagement level of a user.

Figure 6:
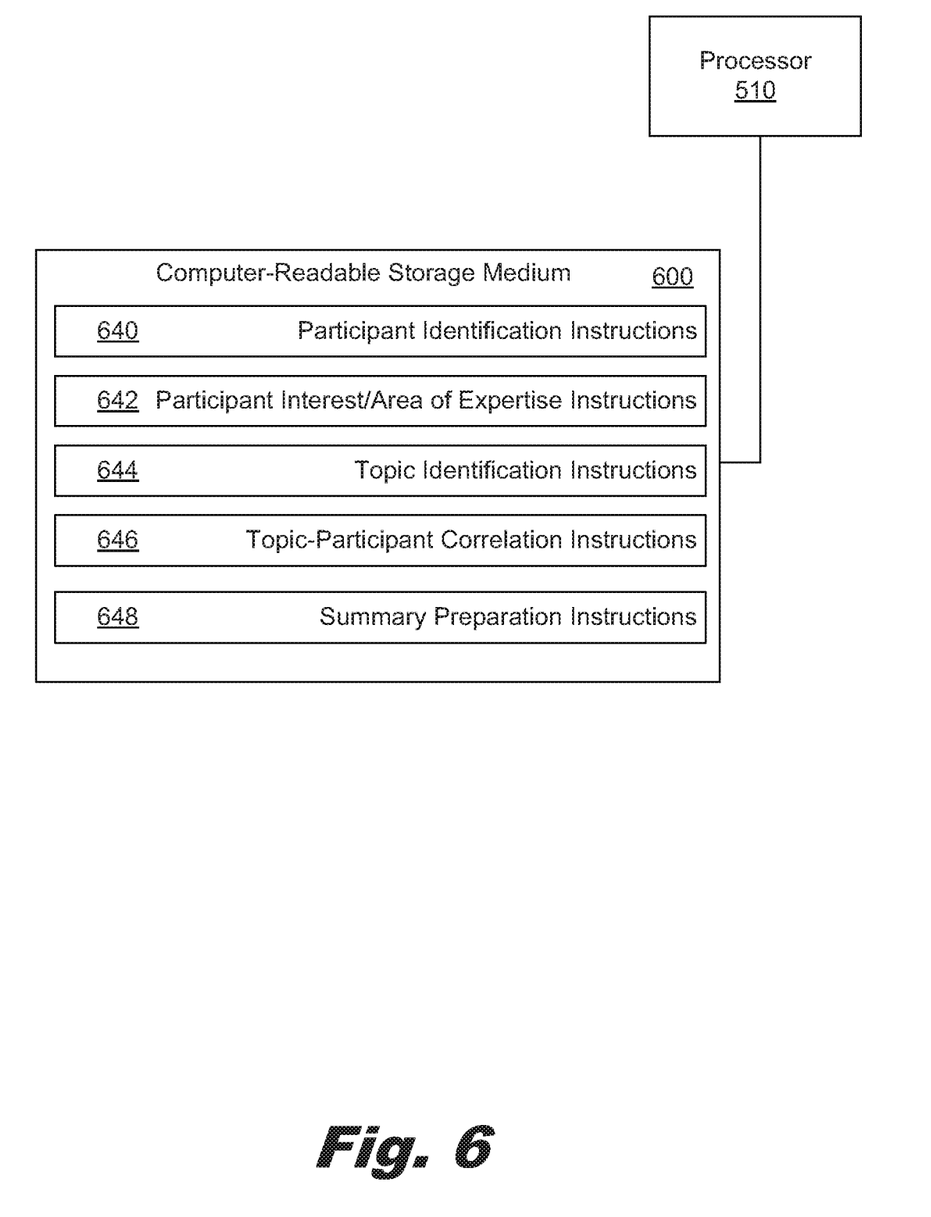
FIG. 6 depicts a computer readable storage medium for managing meetings, according to an example of principles described herein.

FIG. 6 depicts a computer readable storage medium (600) for managing meetings, according to an example of principles described herein. To achieve its desired functionality, a computing system includes various hardware components. Specifically, a computing system includes a processor (510) and a computer-readable storage medium (600). The computer-readable storage medium (600) is communicatively coupled to the processor (510). The computer-readable storage medium (600 includes a number of instructions (640, 642, 644, 646, 648) for performing a designated function. The computer-readable storage medium (600) causes the processor (510) to execute the designated function of the instructions (640, 642, 644, 646, 648).

Referring to FIG. 6, participant identification instructions (640), when executed by the processor (510), cause the processor (510) to identify participants in a current meeting. The participants may be at a single location. The participants may be at multiple locations. Participant Interest/Area of Expertise instructions (510), when executed by the processor (510), may cause the processor (510) to identify areas of expertise, interest, and/or responsibility for a participant in the meeting. This may include accessing a database. This may include running a correlation analysis. Topic identification instructions (644), when executed by the processor (510), may cause the processor (510) to identify topics relevant to a meeting. These topics may be extracted from documents. These topics may be extracted from audio and/or visual content of the meeting. Topic-Participant correlation instructions (646), when executed by the processor (510), may cause the processor (510) to identify relationships between a participant's areas of expertise, interest, and/or responsibility and the identified topic(s) of the meeting. Summary preparation instructions (648), when executed by the processor (510), may cause the processor (510) identify a summary of a topic covered in the meeting. This summary may then be automatically provided to new participants with interests, responsibilities, and/or expertise related to the covered topic.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Such a system facilities meeting management to identify areas of expertise and/or interest among the participants and correlation those with topics. The system may provide an update to a late arrival. The system may prompt users to refocus when material relevant to their areas of interest or expertise are being covered. However, it is contemplated that the systems and method disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method of updating a user joining a group after a user-relevant topic has been discussed, the method comprising, with a processor operatively-coupled to a memory:

identifying a list of topics to be addressed in a current session of a group;

automatically generating an agenda for the current session of the group, wherein the agenda is provided with a first icon indicating an expert is present in the meeting and a second icon indicating an expert is not present in the meeting;

responsive to presentation of the first icon indicating an expert relating to a first topic is present in the current session, initiating discussion of the first topic;

responsive to presentation of the second icon indicating the expert relating to the first topic is not present in the current session, delaying discussion of the first topic;

extracting, from a database, topics from the list of topics relevant to a first user;

determining, based on a timeline, when a first topic is discussed in the current session of the group;

identifying the first user joining the group after the first topic has been discussed in the current session of the group; and determining interest of the first user in the first topic;

monitoring, using a sensor, user engagement in a first communication channel providing the current session;

indicating the first user as engaged responsive to sensor output detecting user activity at a user device;

indicating the first user as under-engaged responsive to a lack of sensor output detecting user activity at the user device;

responsive to the sensor indicating the first user is engaged in the current session, continuing with the first session;

responsive to the sensor indicating the first user is under-engaged in the current session:
 prompting the first user to engage via a second communication channel different than the first communication channel; and
 when the first topic is determined to be of interest to the first user, providing an automated summary of the first topic to the first user via the second communication channel;

activating a learning system to determine whether a sensor-based prompt was relevant;

increasing the use of relevant sensor-based prompts; and decreasing the number of irrelevant sensor-based prompts.

2. The method of claim 1, wherein the automated summary is provided by email.

3. The method of claim 1, wherein the automated summary is provided in a chat window.

4. The method of claim 1, wherein determining interest of the first user in the first topic comprises comparing the first topic against the first user's areas of expertise.

5. The method of claim 1, wherein identifying the first user further comprises verifying an identity of the first user as part of joining the first user to the group.

6. The method of claim 1, wherein the first user is identified by a phone number used to communicate with a conference call hosting a discussion of the group.

7. The method of claim 1, wherein the first user is identified by a password.

8. The method of claim 1, further comprising:
 determining a desired level of engagement by the first user for each topic of the list of topics; and
 categorizing the desired levels of engagement.

9. The method of claim 8, wherein the prompt is provided over an audio channel providing the audio of the meeting to the first user.

10. The method of claim 8, wherein the prompt is provided in a display.

11. The method of claim 8, wherein the desired level of engagement is greater for topics relevant to an area of expertise of the first user than for areas unrelated to the area of expertise of the first user.

12. The method of claim 8, further comprising: creating a timeline of desired engagement of the first user based on areas of expertise of the first user and the list of topics.

13. The method of claim 12, further comprising, displaying the timeline to the first user.

14. The method of claim 13, wherein the timeline comprises an indicator of the current time on the timeline.

15. A computer implemented method of updating a user joining a group after a user-relevant topic has been discussed, the method comprising, with a processor operatively-coupled to a memory:

identifying a list of topics to be addressed in a meeting of a group;

automatically generating an agenda for the meeting, wherein:
 the agenda is provided with a first icon indicating an expert is present in the meeting and a second icon indicating an expert is not present in the meeting;
 times allocated to discuss the list of topics are based on:
  previous meeting time allocations; and
  a position on the agenda;

responsive to presentation of the first icon indicating an expert relating to a first topic is present in the current session, initiating discussion of the first topic;

responsive to presentation of the second icon indicating the expert relating to the first topic is not present in the current session, delaying discussion of the first topic;

identifying topics, from the list of topics that are of interest to the first user, based on:
 attendance and participation of the first user in past sessions;
 a role of the first user; and
 keyword matching between the agenda and a background of the first user, wherein a background of the first user comprises the first user resume and past participation;

scoring a level of interest of each topic to the first user;

determining, based on a timeline and parsed audio, when a first topic is discussed in the current session of the group;

identifying, based on audio capture in the current session, the first user joining the group after the first topic has been discussed in a current session of the group; and determining interest of the first user in the first topic;

when the first topic is determined to be of interest to the first user and the level of interest the first user has in the first topic is greater than a cutoff value, providing an automated summary of the first topic to the first user, wherein a level of detail in the summary is based on the score of the level of interest the first user has in the first topic;

monitoring, using a sensor, engagement of the first user in a first communication channel providing the current session;

indicating the first user as engaged responsive to sensor output detecting user activity at a user device;

indicating the first user as under-engaged responsive to a lack of sensor output detecting user activity at the user device;

displaying a timeline to the first user which indicates level of interest over time;

responsive to the sensor indicating the first user is engaged in the current session, continuing with the first session;
responsive to the sensor indicating the first user is under-engaged in the current session, prompting the first user to engage via a second communication channel different than the first communication channel;
activating a learning system to determine whether a sensor-based prompt was relevant;
increasing the use of relevant sensor-based prompts;
decreasing the number of irrelevant sensor-based prompts; and
altering the timeline to indicate, per topic, when a subject matter expert is present.

\* \* \* \* \*